United States Patent [19]

Geremia

[11] Patent Number: 4,815,371
[45] Date of Patent: Mar. 28, 1989

[54] METHOD FOR PRESSING SCRAP IN A SKIP

[75] Inventor: Nonini Geremia, Buttrio, Italy

[73] Assignee: Danieli & C. Officine Meccaniche SpA, Buttrio, Italy

[21] Appl. No.: 82,215

[22] Filed: Aug. 6, 1987

[30] Foreign Application Priority Data

Sep. 2, 1986 [IT] Italy .................... 83398 A/86

[51] Int. Cl.⁴ .................... B30B 15/32; B30B 9/32
[52] U.S. Cl. .................... 100/35; 100/100; 100/214; 100/229 R; 100/295; 100/218; 414/461; 75/44.5
[58] Field of Search .................. 414/460, 459, 461; 266/901; 75/445; 100/35, 218, 918, 229 R, 295, 196, 214, 100, 224; 280/638, 35

[56] References Cited

U.S. PATENT DOCUMENTS

| 3,386,375 | 6/1968 | Tezuka .................. 100/218 |
| 3,416,436 | 12/1968 | Tezuka . |
| 3,460,363 | 8/1969 | Grantham .............. 100/229 R |
| 3,665,848 | 5/1972 | Kimora et al. .......... 100/218 |
| 4,068,577 | 1/1978 | Murphy .............. 100/229 R X |
| 4,470,580 | 9/1984 | Vezzani . |
| 4,568,236 | 2/1986 | LeBoeuf et al. . |

FOREIGN PATENT DOCUMENTS 0035568 9/1981 European Pat. Off. .

Primary Examiner—Andrew M. Falik
Attorney, Agent, or Firm—Wegner & Bretschneider

[57] ABSTRACT

A system for moving skips to and from a press in a scrap charging zone including at least one skip charging station and a station to press the scrap within the skip. The skip is borne by an independent support with legs in the charging station and is supported on a cradle in the press station. Containment housings are located laterally on a skip in diametrically opposite positions. A skup full of scrap is lifted from its support with legs by a trolley device and taken by such device from the skip charging station or from a parking station for skips and placed on a cradle comprised in cooperation with a press for the pressing of scrap.

8 Claims, 3 Drawing Sheets

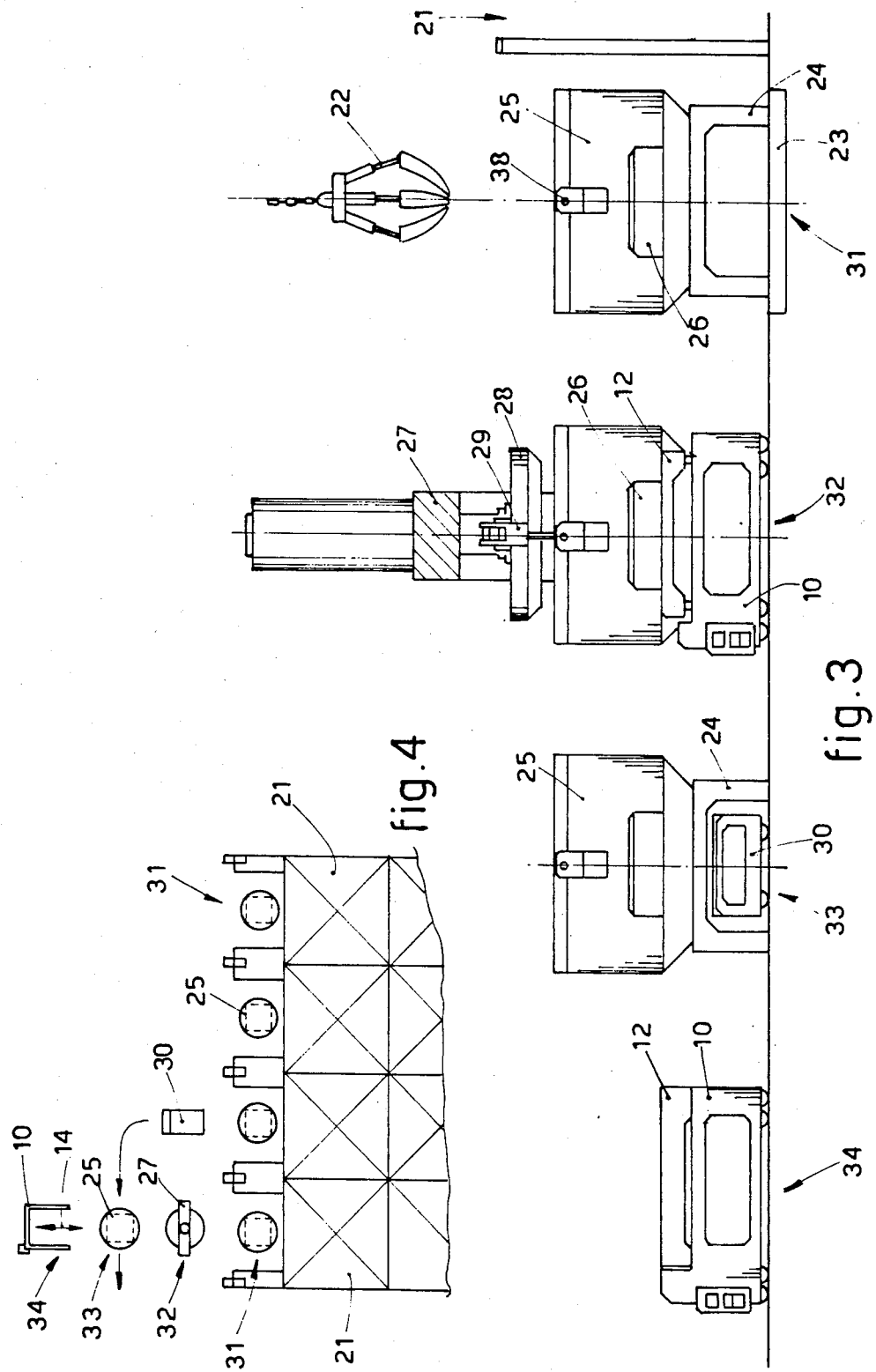

METHOD FOR PRESSING SCRAP IN A SKIP

BACKGROUND OF THE INVENTION

This invention concerns a device to move skips in the scrap charging zone and also concerns a method, arising from the employment of such device, for the movement of skips.

Steelworks have for some time now been practising a method of charging skips with scrap which enables the skips to be filled to the maximum extent possible, the purpose being to speed up the operations of charging smelting furnaces.

To obtain this, a press for scrap has been adopted which enables the scrap to be compacted when it has been introduced into the skips.

To make the compaction action possible, a cradle has also been pre-arranged which accomodates the base of the skips, holds them and positions them.

In this description the word "cradle" covers a very wide range of supports for skips undergoing press action. Such cradle serves also to move the skips within a given limited scope.

During introduction of the scrap the skip is normally borne on an appropriate support or pallet with legs, which also serves normally for the weighing of the charge.

Such support with legs enables the skip to be moved along long distances by means of appropriate vehicles having substantially one single surface with a vertically movable platform. Such vehicles are introduced between the legs of the support, raise their platform, lift the support with the skip thereupon and move this assemblage wherever it is required.

At the required position such vehicles lower their platform, let the legs of the support rest on the ground and depart to move another skip.

Appropriate cranes then transfer the skip from its support to a cradle, which then conveys the skip below the press. This is the system used now and requires the presence of a crane of a great capacity to move the whole. Moreover, the known system makes it necessary to move the skip under the press by means of a cradle.

This entails a considerable immobilization of working equipment and therefore of finance and also very long working times. When one single press has to serve six or more areas employed in the preparation of skips, such working times become very long with long waiting queues due to the transfer times.

U.S. Pat. No. 4,470,580 discloses a press for scrap with a two-dimensional press die and a means to position and support the skip. The means to position and support the skip is a movable carriage with means to transfer the carriage itself, which runs on its own runways.

U.S. Pat. No. 3,416,436 discloses a scrap press cooperating with at least one charging and discharging station, the skip holding the scrap being moved on guides from that station to the press and back; the press is equipped with an extractor jack.

U.S. Pat. No. 4,568,236 discloses a trailer with a movable platform to move heavy loads on roads and highways.

EP No. 0.035.568 discloses a press to make briquettes, in which a carriage holding a mould cooperates with the press itself.

SUMMARY OF THE INVENTION

By means of this invention the present applicant has overcome the problems linked to the known art and has obtained many advantages.

The invention enables the yard employed for the movement of skips to be kept free of cranes or other transport means; it enables very short handling times to be obtained and permits the required skip to be conveyed to the press zone and to be pressed as needed; it enables the working cycle to be simplified in the zone of charging and pressing the skip.

According to the invention a trolley device with two side members is provided.

Such trolley device comprises two side frame members with vertically movable bars able to cooperate with the base of containment housings which contain, for instance, the mechanisms for opening the lower hinged discharge flaps of the skip.

This enables the trolley device to be introduced below the skip and at the same time to contain a support with legs between its two side frame members, to raise the movable bars until they lift the skip by thrusting against the above containment housings and then to move to the place where the skip is to be deposited, thereafter repeating the operation in the reverse order.

According to the invention a cradle remains stationary under the press and the trolley device handles the skip.

According to the invention the trolley device may comprise rubber wheels for its movement or wheels suitable for running on rails.

Moreover, the movement of the trolley may be carried out by independent means or by cables, that is to say, a pair of endless cables on the trolley device serve to move it to-and-fro.

The invention is therefore embodied with a device to move skips in a scrap charging zone providing at least one charging station and a station to press the scrap within the skip, the skip being borne by an independent support with legs in the charging station and being supported on a cradle in the press station and comprising containment housings in diametrically opposite positions, the median vertical plane of the press being substantially normal to the lengthwise axis of movement of the skip, the device being characterized in that it is of a trolley type with two side frame members, each of which comprises an upper bar able to move vertically at least between an inactive position and a working position, the upper bars cooperating with the containment housings.

The invention is also obtained with a method to move skips in a scrap charging zone providing at least one charging station and a station to press the scrap within the skip, the skip being borne by an independent support with legs in the charging station and being supported on a cradle in the press station and comprising containment housings laterally for the opening of lower hinged discharge flaps of the skip, the median vertical plane of the press being substantially normal to the lengthwise axis of movement of the skip, the method being characterized in that a skip full of scrap is lifted and withdrawn from its support with legs by a trolley device and taken by such device from the charging station or from a parking station for skips and placed on a cradle comprised in cooperation with a press for the pressing of scrap.

BRIEF DESCRIPTION OF THE DRAWINGS

The attached figures, which are given as a non-resistive example, show the following:

FIG. 3 gives a side elevational view of the method of working of the device;

FIG. 4 gives a planar view from above of the zone for the handling
of scrap and preparation of skips.

DETAILED DESCRIPTION OF THE PREFERRED EMBODIMENTS

Figure 1:
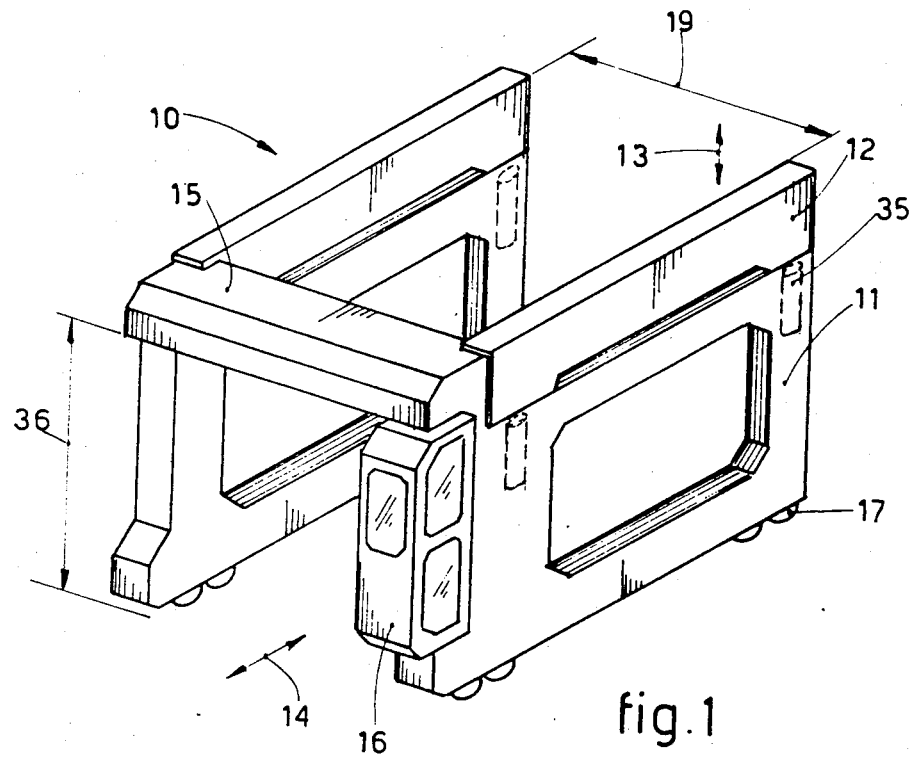
FIG. 1 shows a front perspective view of a device according to the invention.

A trolley device 10 comprises two side frame members 11 on which are included two vertically movable bars 12. The vertical movement of such bars 12 is obtained with jacks 35 contained, for instance, in the side frame members 11.

The bars 12 can therefore be raised and lowered according to the arrows 13, thus taking up an inactive position when they are lowered and a working position when they are raised.

When the bars 12 are lowered, the trolley device 10 can pass beneath containment housings 26 of skips 25 when the skips 25 are rested on supports with legs 24, the housings 26 protruding substantially from the skips.

When the bars 12 are raised and lift the containment housings 26, the skips 25, being integrally fixed to the housings 26, are lifted from the supports with legs 24.

The trolley device 10 comprises a main frame member 15 which connects the two side frame members 11, thus stiffening the trolley device 10.

The trolley device 10 comprises also wheels 17 and a control and driving cab 16.

The inner width 19 of the trolley device 10 is greater than the outer width 319 of the support legs 24, the support having a substantially square floor plan, so that the trolley device 10 can pass completely with its side members 11 running outside the sides of the support 24 since the height 36 of the main frame member 15 is greater than the height of the support 24.

The outer width of the trolley device 10 is smaller than the inner width of a press 27, so that the trolley device 10 can run between side frame members of the press 27.

The trolley device 10 can move to-and-fro as required according to the arrows 14, and the inclination of the cab 16 facilitates operations.

In a variant the side frame members 11 of the trolley may be arranged so that their height 18 is less than the height between the support surface of the support with legs 24 and the lower surface of the mechanism containment housings 26.

In such a variant the side frame members 11 will comprise advantageously a portal shaped as an inverted 'U' and having a free vertical height 36 greater than the height of the support with legs 24 and a free width 19 greater than the width 219 of the support 24 (see FIGS. 2 and 5), so that the support with legs 24 borne on a vehicle 30 can pass between the legs of the side frame members 18 of the trolley 10.

Figure 2:
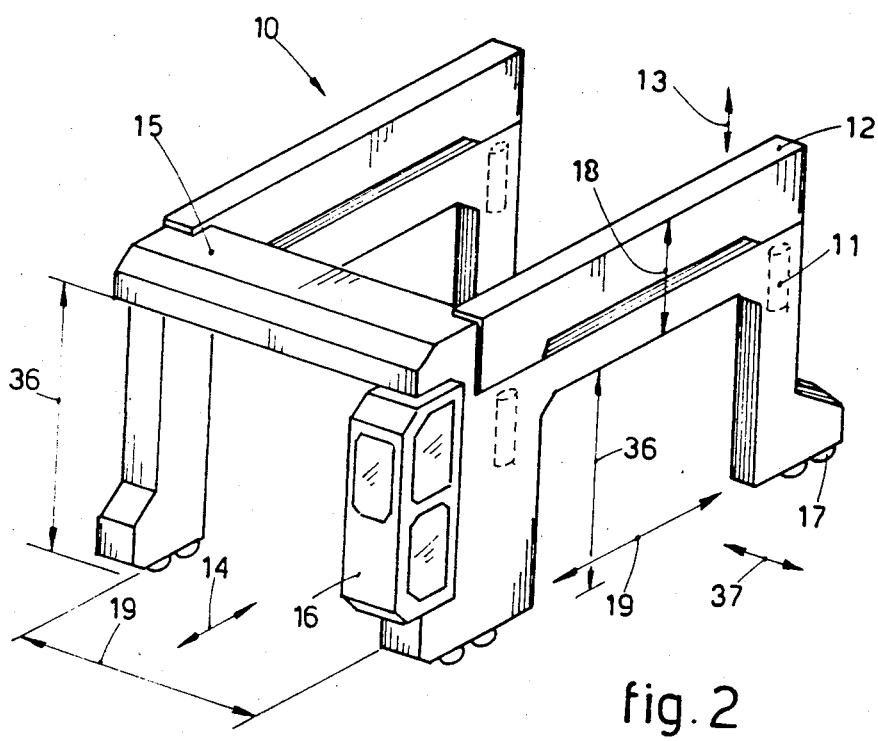
FIG. 2 shows a front perspective view of a variant of the device of FIG. 1.

In the variant of FIG. 2, therefore, the support with legs 24 can be displaced sideways according to the arrows 37 and thus can be removed crosswise through the side frame members 11 of the trolley by a vehicle 30 having a movable platform.

According to the invention a press 27 is provided substantially on the same axis as the skip charging station 31.

In an area for the charging of skips 25 various charging stations 31 may be comprised and be equipped with a support with legs 24 cooperating with a weighing machine 23.

The supports with legs 24 are able to move and can be moved anywhere; they may be stationary in the charging stations 31 alone.

Each of the charging stations 31 cooperates with a pit 21 for scrap and is equipped with charging grabs 22.

When a skip 25 in the charging station 31 has been charged with the required amount of scrap, it is taken by a trolley device 10, lifted and conveyed to a press station 32, where it is placed on an appropriate cradle.

Figure 5:
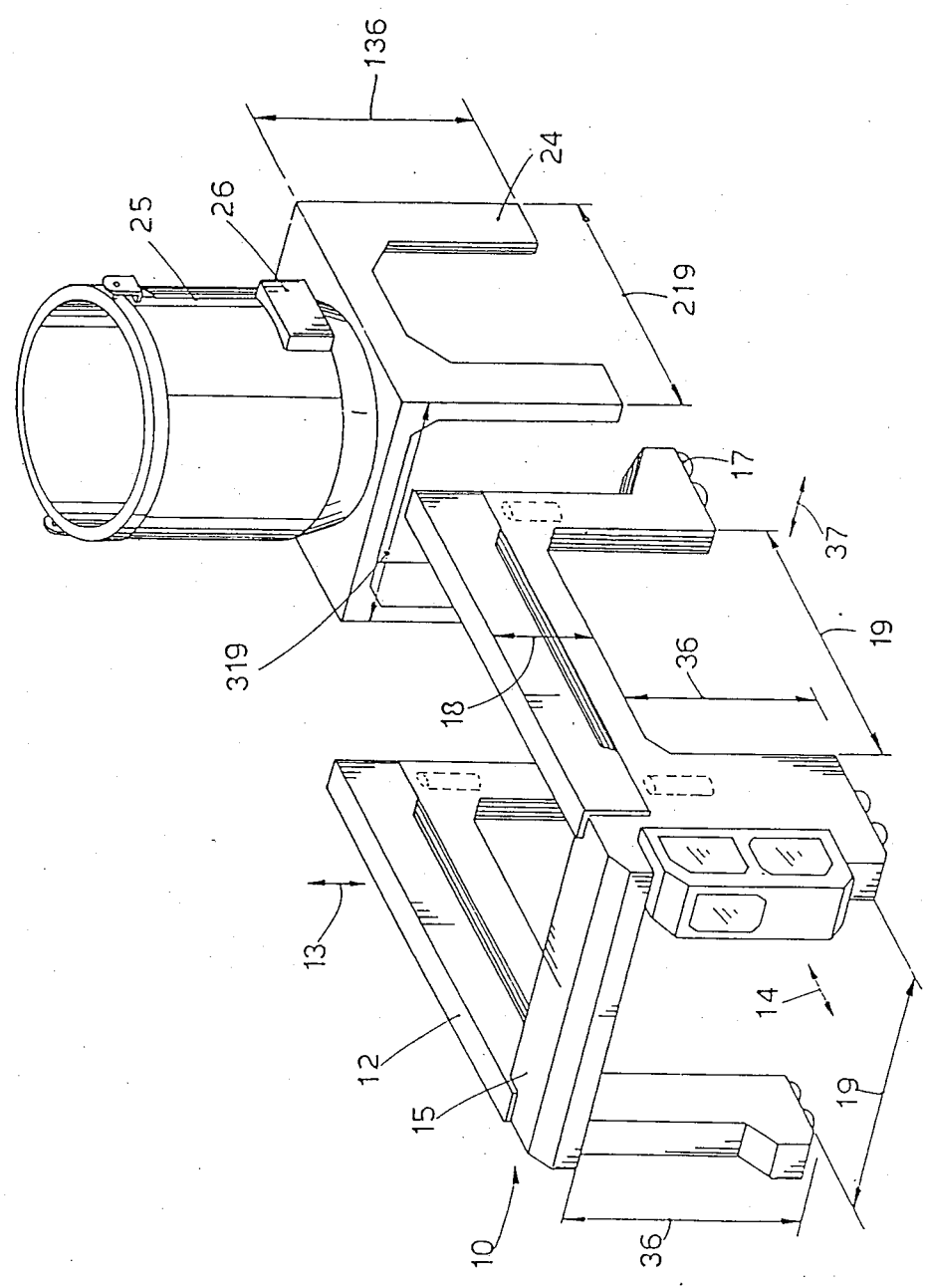
FIG. 5 gives a front perspective view of the trolley device fitted around the skip and support, as in the present invention.

FIG. 5 shows the skip (25) with containment housing (26) positioned on the support with legs (24) fit within the trolley device (10) of FIG. 2 for lifting and conveying of the skip to a press station (32).

In a variant the skip 25 is delivered in the press station 32 to a lifting system 29 of a type protected by related U.S. application Ser. No. 082,319 filed by the present applicant. Such lifting system 29 cooperates with eyelets 38 provided at the sides or top of the skip 25.

When the scrap in the skip 25 supported on the cradle of the press 27 has been pressed, the skip 25 is taken once more by the trolley device 10 and moved thereby to a parking station 33 for skips, where a support with legs 24 is ready to accommodate it.

As soon as the skip 25 with its scrap pressed is placed on the support with legs 24 of the parking station, a vehicle 30 arrives to withdraw the support 24 together with the skip 25.

Alternatively, the support with legs 24 may already be present in the parking station 33.

In the variant of the device 10 according to FIG. 2, when the device 10 is in the parking station 33, the vehicle 30 holding the support 24 passes through the device 10 crosswise and has the support 24 ready and positioned for delivery of skips 25.

So as to be able to free the parking station 33, the device 10 then moves to a parking station 34 whenever it includes the main frame member 15.

When a skip 25 arrives at the parking station 33, it may be full of scrap to be pressed or may be empty so as to replace a skip 25 already present in the skip charging station 31 or already pressed and removed.

If the trolley device 10 is of the type of the variant of FIG. 2, a support 24 freed of a skip may be removed by the vehicle 30 even if the device 10 is in the parking station 33.

In a further variant the device 10 may not comprise the main frame member 15; in such an event the two side frame members 11 are self-aligning in relation to each other.

I claim:

1. Method for pressing scrap in a skip, comprising:
providing a skip containing to be pressed, said skip being supported on a support with legs, the skip being provided with protrusions on its sidewall;
removing the skip from the support with legs by means of a trolley device, the trolley device comprising two side frame members, each of which comprises an upper bar able to move vertically between an inactive position and a working position, the upper bars engaging said protrusions of the skip to lift the skip from the support with legs;

transporting the skip to a press by means of said trolley device, the median vertical plane of the press being substantially normal to the lengthwise axis of movement of the skip;

positioning the skip on a cradle; and pressing the scrap in the skip while the skip is supported by the cradle.

2. Method as claimed in claim 1, wherein the distance between the inner sides of the side frame members of the trolley device is greater than the width of the support with legs.

3. Method as claimed in claim 1, wherein the two side frame members of the trolley device each are shaped as an inverted "U".

4. Method as claimed in claim 1, wherein said side frame members have legs and in which the inner sides of the legs of each side frame member are separated by a distance greater than the width of the support with legs.

5. Method as claimed in claim 1, wherein said side frame members each have an upper crosspiece beneath the moveable bar and in which the height of the upper crosspiece of the two side frame members is greater than the height of the support with legs.

6. Method as claimed in claim 1, wherein the side frame members are joined by a main frame member, the main frame member having a height greater than the height of the support with legs.

7. Method as claimed in claim 1, in which when the scrap has been pressed in the skip, the skip is lifted from the cradle and taken by the trolley device to a support with legs.

8. Method as claimed in claim 1, in which an empty skip supported on a support with legs in a skip parking station is lifted from the support with legs and taken by the trolley device and delivered to a further support with legs in a skip charging station, the method further comprising charging said skip with scrap to be pressed in the skip charging station.

* * * * *